United States Patent [19]

Snyder

[11] 3,740,724

[45] June 19, 1973

[54] TRANSLATING METHODS AND APPARATUS

[75] Inventor: Carl J. Snyder, Raleigh, N.C.

[73] Assignee: Westinghouse Electric Corporation, Pittsburgh, Pa.

[22] Filed: May 14, 1971

[21] Appl. No.: 143,428

[52] U.S. Cl. .............................................. 340/172.5

[51] Int. Cl. ................................................ G06f 3/00

[58] Field of Search ..................... 340/172.5, 174.1; 235/157, 92

[56] References Cited

UNITED STATES PATENTS

| | | | |
|---|---|---|---|
| 3,587,044 | 6/1971 | Jenkins | 340/172.5 |
| 3,411,144 | 11/1968 | Rausch | 340/172.5 |
| 3,585,599 | 6/1971 | Hitt et al. | 340/172.5 |
| 3,582,901 | 6/1971 | Cochrane et al. | 340/172.5 |
| 3,558,811 | 1/1971 | Montevecchio | 340/172.5 |
| 3,581,286 | 5/1971 | Beausoleil | 340/172.5 |

*Primary Examiner*—Paul J. Henon
*Assistant Examiner*—Mark Edward Nusbaum
*Attorney*—A. T. Stratton and Donald R. Lackey

[57] ABSTRACT

Translating methods and apparatus for interfacing a peripheral device and a computer. Information from the peripheral device is converted into data pulses and spaced timing or interval pulses. Data pulses occurring between interval pulses are counted by a binary counter, and a latch follows the output of the counter. Each interval pulse initiates setting the latch to hold the count, resetting the binary counter, and it enables the reading and the resetting of the latch.

9 Claims, 3 Drawing Figures

Patented June 19, 1973

3,740,724

2 Sheets-Sheet 1

WITNESSES

Theodore F. Wrobel

James F. Young

INVENTOR

Carl J. Snyder

BY Donald R. Lackey

ATTORNEY

TRANSLATING METHODS AND APPARATUS

BACKGROUND OF THE INVENTION

1. Field of the Invention

The invention relates in general to translating methods and apparatus, and more specifically to methods and apparatus for interfacing a peripheral data input device with a digital computer.

2. Description of the Prior Art

It is common in the prior art to collect data using a sensor having an appropriate pulse initiator, and to record the data on magnetic tape. The magnetic tape includes one channel for recording time pulses, and one or more channels for recording pulses from one or more sensors. Sensors which output a contact closure at a rate proportional to or representing events to be recorded, are directly connected to the tape recorder, while sensors which output a continuous electrical signal having a magnitude proportional to the events being sensed, are used with integrating circuitry which converts the continuous electrical signal to a pulse rate. Power usage data usually uses the contact closure type of sensor, converting the disc rotation of integrating kilowatt hour meters into a series of pulses which, accordingly, represent a predetermined amount of power in kilowatt hours for load totalizing, demand metering, and the like. On the other hand, sensors used to monitor air pollution usually generate a continuous electrical signal whose magnitude is proportional to the concentration of the pollutant being sensed.

After the pulse information is recorded on magnetic tape, it is desirable to be able to quickly perform such functions as totalizing the number of pulses on each data channel of the tape, counting the number of pulses during each time interval, and comparing each interval count with the largest preceding interval count, updating as required to keep track of the time interval having the largest number of data pulses. In addition to totalizing, comparing, and updating, in some applications it is necessary to obtain information from plural measured and recorded quantities, such as volt-amperes from measurements of real and reactive power. In this instance, it is desirable to quickly process the information from the separate channels and provide the desired resultant.

The required functions of totalizing, comparing, updating, and processing plural channels to obtain a resultant, may be quickly and easily performed with a computer, and the computer can print out a record of the resulting information.

Tape-to-tape translators are used in the prior art, which play back the field tapes recorded on survey, demand, or pollutant recorders, the data pulses and interval pulses are converted into a form suitable for entry into a computer, and this information is recorded on magnetic tape. These tape-to-tape translators usually utilize two groups of pulse counters, with one group of counters tabulating the pulses during one interval of time, while the second group of counters is reading out the count from the preceding time interval. When the next interval pulse is received, these functions are reversed. While these tape-to-tape translators perform satisfactorily, each set of counters requires its own readout lines, interval gates are required to switch the counting and reading functions of the two sets of counters at each interval pulse, and the circuitry required to gate the readings one digit at a time from the counters is complex.

Thus, it would be desirable to provide new and improved translating methods and apparatus for processing data information, which is less complex and thus more reliable than translating methods and apparatus of the prior art.

SUMMARY OF THE INVENTION

Briefly, the present invention is new and improved translating methods and apparatus for processing data pulses recorded on magnetic tape. The new and improved apparatus includes a small computer, such as a 16 bit/word device with a 4k programmed memory. The interface logic hardware utilizes a single binary counter for each channel of data information recorded on the tape. The single counter per channel is made possible by latches having binary outputs which follow the counts of the counters, and interval pulse logic and timing circuitry which utilize the interval pulse to set the latches to hold the count, to reset the counters to zero, and to enable the reading and the resetting of the latches. The count held by the latches is gated to the computer memory, and the computer may be programmed to process the information and read it out to magnetic tape compatible with large computers, and, if desired, to a peripheral device such as a teletypewriter to obtain a hard copy of the data. Alternatively, the information stored in the computer may be directly transmitted to a large computer via a suitable communication link. The large computer, whether directly accessed or supplied with computer tape, may be programmed, for example, to prepare bills based on power usage and demand, if the magnetic tapes contain such information.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF PREFERRED EMBODIMENTS

Figures 1, 3:
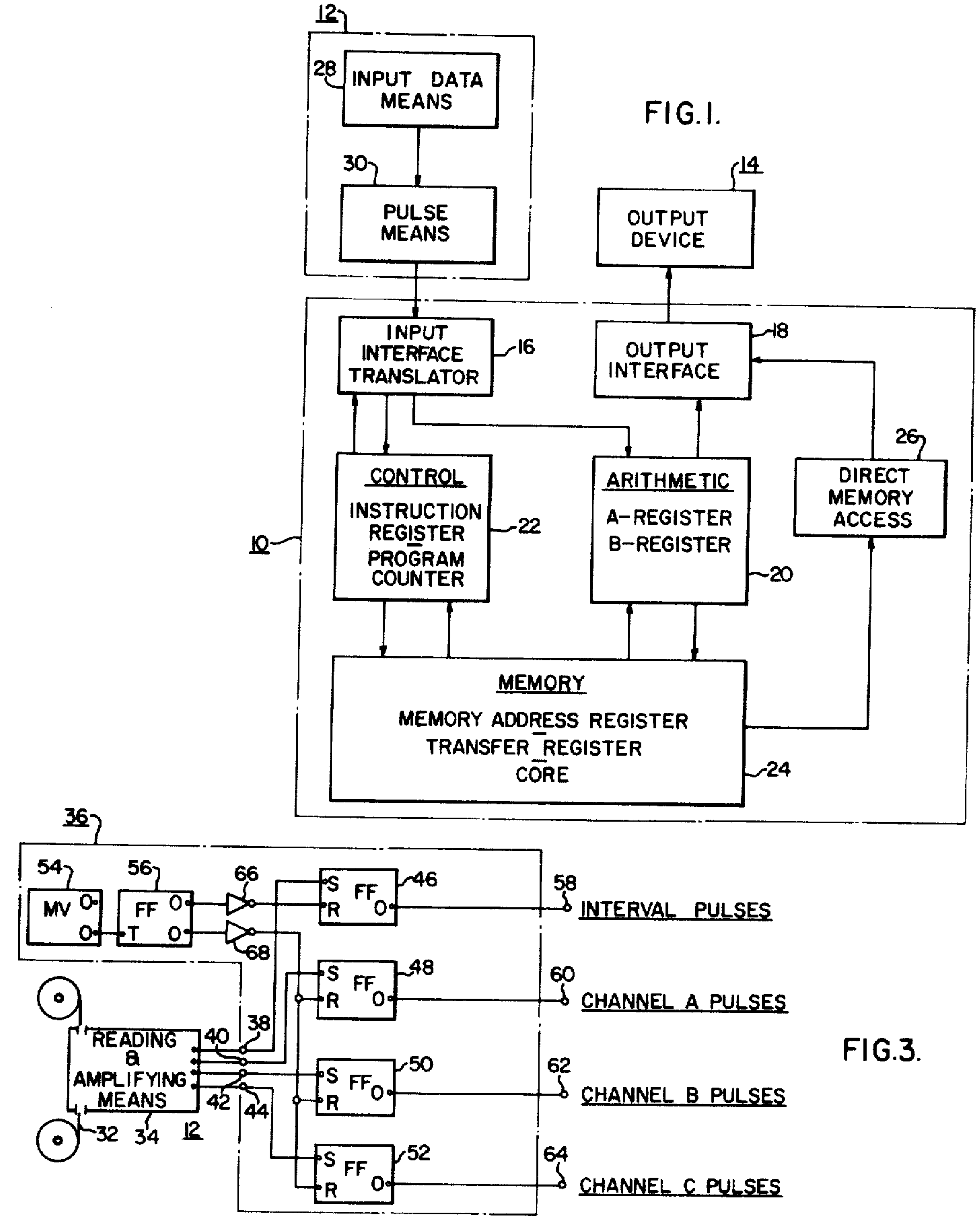
FIG. 1 is a block diagram which functionally illustrates a computer with input data means which may be interfaced according to the teachings of the invention.
FIG. 3 is a schematic representation of a tape reader and anticoincident circuit which may be used to supply time and data pulses to the translator shown in FIG. 2.

Referring now to the drawings, and FIG. 1 in particular, there is shown a block diagram of a computer 10, along with input and output peripherals shown generally at 12 and 14, respectively. Computer 10, which is a small general purpose computer designed for input/output flexibility, such as the Hewlett-Packard Model 2114B described in Hewlett-Packard Catalog No. 5950-8718, A Pocket Guide to Interfacing Hewlett-Packard Computers, dated September, 1969, is used to form part of a programmable translator constructed according to the teachings of the invention.

Basically, computer 10 includes an input interface section having a translator 16 described in detail hereinbelow, an output section 18, an arithmetic unit 20, a control unit 22, and a memory 24. The input section receives data from devices which read pulse information from recording media, such as punched or magnetic tape, or which allow manual entry of data, with this data being stored in the computer memory. The basic function of the input section is to translate the data from the form in which it is received, into a form in which it can be stored in the computer memory. The output section of the computer transmits data to output devices, such as magnetic tape units and printers. Thus, the computer can read from magnetic tape, convert the information into a form acceptable by a computer, and record this form on another magnetic tape which can be utilized by another computer. The arithmetic unit of the computer includes registers or accumulators, and associated logic circuitry. The computer model hereinbefore referred to includes two registers in the arithmetic unit, termed the A and B registers. The registers of the arithmetic unit 20 receive data from the input interface, and the logic circuitry of the arithmetic unit enables the data to be manipulated, totalized, and combined with, or compared with data stored in the memory. The control unit directs the transfer of data between the computer registers and controls the operations performed, it interprets instructions from the memory, and sets up gating functions to carry out their execution. The control unit distinguishes between data and program words, and uses a program counter or P-register for this purpose. The control unit also includes the instruction register, or I-register, which holds the instruction designated in the program word. The memory 24 includes two registers, the transfer or T-register and the memory address or M-register, as well as the memory, which will be called the core memory since it is usually made up of an intricate matrix of ferrite cores. All data read from the core memory or written into the core memory is transferred by way of the T-register. The M-register contains the address of the memory location from which data will be read, or into which data will be stored.

The computer 10 may also include a direct memory access function, shown generally at 26, which enables data to be entered into the memory, or withdrawn therefrom, via the transfer register, by-passing the arithmetic unit 20. Direct memory access does not interrupt the program in progress, but "takes" cycles from it. The direct memory access 26 is illustrated in FIG. 1 as being used only for withdrawal of information from the memory 24.

The input peripheral 12 may include any form of continuously recorded pulse information, indicated generally by block 28, such as magnetized pulses of a magnetic tape or holes of a punched card, along with pulse means 30 for reading the recorded data and generating electrical data pulses, as well as electrical timing or interval pulses in response thereto. For purposes of example, it will be assumed that the input data is magnetically recorded recorded on magnetic tape. The output device or peripheral 14 may be magnetic tape suitable for direct processing by a larger computer, and/or a printer for providing a hard copy of the data.

In the operation of computer 10, the memory address register contains the address of the next instruction to be executed. This instruction or word is read from the memory and placed in the transfer register. The instruction field of the word is transferred to the instruction register of the control unit 22, and the address field of the word is placed in the memory address register. The control logic thus knows what instruction is to be executed, and the memory address register is set up so the proper memory location may be accessed for data. If the instruction to be executed is, for example, to add, the data word contained in the memory location specified in the memory address register will be read from the memory into the transfer register, and then added to the specified A or B register in the arithmetic unit 20. The program counter in the control unit 22 is then incremented by one, and the new content of the program counter will be stored both in the program counter and the memory address register. This completes the execution of the current instruction.

Input/output data transfers are normally made through the A or B register, and may be manipulated by arithmetic or control logic, and/or transferred through the transfer register into the core. As hereinbefore stated, the A and B registers of the arithmetic unit 20 may be bypassed, to load information directly into the memory, or to read information directly out of the memory, when direct memory access 26 is provided.

The present invention primarily concerns the input interface 16 portion of the computer 10, disclosing new and improved methods and apparatus for interfacing an input peripheral 12 with the computer 10, to provide a translator which is more versatile and flexible than those in the prior art, and at the same time making the translator less complex and more reliable.

Figure 2:
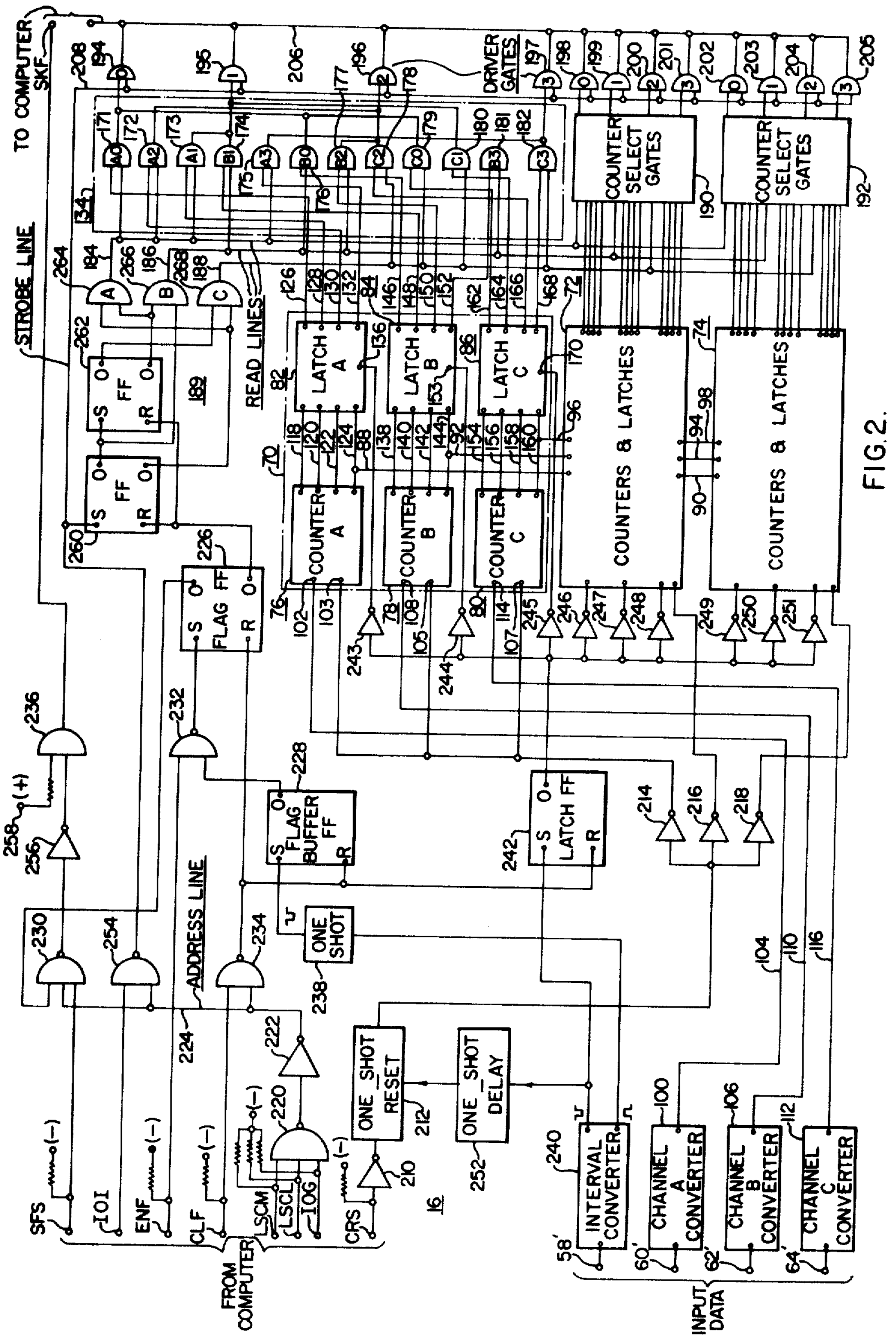
FIG. 2 is a schematic representation of a translator constructed according to the teachings of the invention, which functions as the input interface between a peripheral supplying field recorded data in the form of pulses, and a computer.

FIG. 2 is a schematic representation of an input interface with a translator 16 constructed according to the teachings of the invention, and FIG. 3 is a schematic representation of a peripheral device 12 which may be used to provide pulses to the input interface translator 16.

As illustrated in FIG. 3, the input pulse information has been recorded on magnetic tape 32 by an appropriate continuously operating field recorder located at a field location remote from the computer 10, and it will be assumed that the magnetic tape 32 includes three channels of recorded data pulse information from three different sensors producing pulses at a rate proportional to the level of a quantity measured by the sensors, which channels will be termed the A, B and C channels, and also a channel for time information upon which time based interval signals are recorded along with the recorded data pulses. The magnetic tape is read by reading and amplifying means 34 which has a four-channel head for reproducing electrical pulses from the recorded pulse information from the four channels on the magnetic tape. The resulting electrically signals, which may be somewhat sinusoidal, may be shaped to substantially a square wave, such as by a Schmitt trigger, and these square wave pulses are inverted to make the leading edge of the pulse negative going for triggering NAND type flip-flops. The square wave pulses generated by the reading and amplifying means 34 are applied to terminals 38, 40, 42 and 44 of anticoincident means 36, with the interval pulse being applied to terminal 38 and the data pulses from the A, B and C channels to terminals 40, 42 and 44, respectively.

Anticoincident means 36 prevents a demand or data pulse from coinciding with an interval pulse, and it includes four set-reset flip-flops 46, 48, 50 and 52, a free-running multivibrator 54, and a trigger flip-flop 56. The interval and data pulses applied to terminals 38, 40, 42 and 44 are connected to the set inputs of flip-flops 46, 48, 50 and 52, respectively, where the pulses are stored momentarily, until the flip-flops are reset and their contents directed to output terminals 58, 60, 62 and 64.

The resetting of the flip-flops 46, 48, 50 and 52 is accomplished by the free-running multivibrator 54 driving the trigger flip-flop 56. One output of trigger flip-flop 56 is connected via inverter 66 to the reset terminal R of the interval flip-flop 46, and the complementary output of flip-flop 56 is connected via inverter 68 to the reset terminals R of the data flip-flops 48, 50 and 52. As the trigger flip-flop 56 changes state, it alternately resets the set-reset flip-flops 48, 50 and 52 of the data channels and then the flip-flop 46 of the interval channel. Thus, the anticoincident circuit 36 can never output an interval pulse simultaneously with a data pulse. The rate of the free running multivibrator 54 is selected to be much faster than pulses can arrive at the maximum tape rate, to insure that pulses are not missed while the flip-flops are resetting. For example, an 80 KHz. multivibrator rate for a 30 inch per second tape rate is suitable.

Output terminals 58, 60, 62 and 64 of the anticoincident circuit 36 shown in FIG. 3, are connected to input terminals 58', 60', 62', and 64', respectively, of the translator 16 shown in FIG. 2. The input interface translator 16 shown in FIG. 2 includes binary counters and latches for each data channel, with the counters and latches for the first 4 bits (low order) of each channel being indicated generally at 70, the second 4 bits for each data channel are indicated generally at 72, and the third (high order) 4 bits are indicated generally at 74. Since the 4 bit counters and latches for each order are similar, they are separately illustrated relative to the first or low order group 70, and shown generally relative to orders 72 and 74.

More specifically, the first group 70 of counters and latches include three binary counters 76, 78 and 80 for data channels A, B and C, respectively, which for purposes of example will be 4-bit counters, and three 4-bit bistable latches 82, 84 and 86 which have four bit outputs that follow the binary counts of the 4 bit outputs of the binary counters 76, 78 and 80, respectively while the latching inputs of the latches are enabled in a reset condition. The counters and latches may be conventional, such as Texas Instrument types SN7493N and SN7475N, respectively, described in Texas Instrument Catalog No. CC201-R, Integrated Circuits, dated Aug. 1, 1969. The A channel counters of the three orders or groups 70, 72 and 74 are interconnected via conductors 88 and 90, the B channel counters of the three orders are interconnected via conductors 92 and 94 and the C channel counters of the three orders are interconnected via conductors 96 and 98.

The incoming A channel data pulses applied to terminal 60' are passed through a converter or noise inhibiting line receiver 100, to obtain the desired logic level, and the resulting pulses are applied to input terminal 102 of counter 76 via conductor 104. The B channel pulses from input terminal 62' are passed through converter 106 and applied to input terminal 108 of counter 78 via conductor 110. The C channel pulses from input terminal 64' are passed through converter 112 and applied to input terminal 114 of counter 80 via conductor 116. Counters 76, 78 and 80 are reset to zero by an appropriate signal applied to input terminals 103, 105 and 107, respectively.

Latch 82 is responsive to the four bits of counter 76 via conductors 118, 120, 122 and 124, and four bit output is connected to counter select gates via conductors 126, 128, 130 and 132, with the counter select gates associated with the first group 70 of counters and latches being represented generally by the reference numeral 134. The input of latch 82 follows to have the same logic levels as the output of its associated binary counter 76, and the 4 bit output of latch 82 follows to have the same logic levels as the input of the latch as long as the latch line connected to its input terminal 136 is enable or reset by a "high" or at the one logic level. Driving the latch line "low" or to the zero logic level holds or sets the levels of the latch output to the count therein as of the time of setting the latch, and this count is held until it is read out and the latch line returned to the logic one level.

Latch 84 is responsive to the 4 bits of counter 78 via conductors 138, 140, 142 and 144, and the four bit output of latch 84 is connected to the counter select gates shown generally at 134, via conductors 146, 148, 150 and 152. The latch line for latch 84 is connected to input terminal 153.

Latch 86 is responsive to the 4 bits of counter 80 via conductors 154, 156, 158 and 160, and its 4 bit output is connected to counter select gates 134 via conductors 162, 164, 166 and 168. The latch line for latch 86 is connected to input terminal 170.

The second and third groups 72 and 74, respectively, of counters and latches are each constructed similar to the first group 70, and need not be described in detail.

The counter select gates 134 associated with the first order latches and counters 70 include twelve AND gates 171, 172, 173, 174, 175, 176, 177, 178, 179, 180, 181 and 182. There are four AND gates for each latch 4 bit output, in order to read out the 4 bits of information from each latch, with each gate being labeled with its channel letter and bit number. The A channel AND gates 171, 173, 172 and 175 are connected to the four bit output of latch 82 via conductors 126, 128, 130 and 132, respectively, and to an A channel read line 184. The B channel AND gates 176, 174, 177 and 181 are connected to the output of latch 84 via conductors 146, 148, 150 and 152, respectively, and to a B channel read line 186. The C channel AND gates 179, 180, 178 and 182 are connected to the output of latch 86 via conductors 162, 164, 166 and 168, respectively, and to a C channel read line 188.

The second and third groups 72 and 74 of counters and latches of the A, B and C channels of data information, are each connected to 12 counter select AND gates, shown generally at 190 and 192, respectively. The counter select AND gates 190 and 192 are each arranged and connected in a manner similar to the counter select AND gates 134, and need not be described in detail. The counter select AND gates 190 and 192 are connected to the A, B and C channel read lines 184, 186 and 188, respectively, also as described relative to the counter select AND gates 134. The A, B and C channel read lines 184, 186 and 188 are sequentially enabled by counting means 189, which will be hereinafter described.

Since the A, B and C data channels are read out sequentially, it is necessary to provide only 12 driver gates, four for each order of counters and latches, for driving the information into the computer registers. These driver gates, referenced 194, 195, 196, 197, 198, 199, 200, 201, 202, 203, 204 and 205 are each labeled with its associated bit number, 0 through 3, for the three orders of bits. Driver gate 194 which reads out the "zero" bit for the first or low order to a serial drive line 206, has one input connected to the A, B and C channel zero bit counter select gates 171, 176 and 179, respectively, and its other input is connected to a strobe line 208, which strobes out the binary data upon command of the computer, as will be hereinafter explained. In like manner, driver gate 195, which reads out the "one" bit for the first group to drive line 206, has one input connected to the A, B and C one bit counter select gates 173, 174 and 180, respectively, and its other input is connected to strobe line 208. Driver gate 196, which reads out the "two" bit for the first order group to drive line 206, has one input connected to the A, B and C two bit counter select gates 172, 177 and 178, respectively, and its other input is connected to strobe line 208. Driver gate 197, which reads out the "three" bit for the first order group to drive line 206, has one input connected to the A, B and C three bit counter select gates 175, 181 and 182, respectively, and its other input is connected to strobe line 208.

The remaining drive gates which all have their outputs connected to the driver line 206, have their inputs connected to their associated counter select gates and to the strobe line 208, in a manner similar to the connection of driver gates 194, 195, 196 and 197, and need not be described in detail. The serial drive line 206 is shown schematically connected directly to the driver gates, however it is to be understood that a conventional shift register of matrix type converter, not shown, can be used to transfer the parallel pulses of these gates to serial pulses on the line 206.

The computer provides a plurality of control signals for translator 16 in response to its instructions. At the start of the field recorded tape 32 in reading means 34 to be translated, the computer applies a CRS signal to input terminal CRS, which signal is inverted by inverter 210, and the negative going portion of the inverted signal triggers a one shot multivibrator 212. The single output pulse of the one shot multivibrator 212 is inverted by inverters 214, 216 and 218, and applied to all of the counters of the A, B and C data channels, to reset them to zero.

The initializing or start instructions, just prior to starting the playing of the field tape, also provide signals from the computer which are termed the LSCM, LSCL, IOG and CLF signals, which are applied to terminals of the translator 16 having the same letters. The LSCM, LSCL and IOG signals are from the computer address card, and are responsive to the most significant address digit, the least significant address digit, and an input instruction, respectively. These three signals are applied to a NAND gate 220, and when all three signals are present, the NAND gate 220 outputs a zero logic level which is inverted by inverter 222, to enable the address line 224.

The CLF signal from the computer is concerned with a flag circuit in the translator 16, which circuit signals the computer when data is ready to be transferred from the translator 16 to the arithmetic unit of the computer. The flag circuit includes a set-reset flip-flop 226, termed a flag flip-flop, a set-reset flip-flop 228, termed the flag buffer flip-flop, NAND gates 230, 232 and 234, and an AND gate 236.

The reset input R of flag flip-flop 226 is connected to the output of NAND gate 234, its set input S is connected to the output of NAND gate 232, its reset output is connected to counting means 189, and its set output is connected to an input of NAND gate 230.

The set input S of flag buffer flip-flop 228 is connected to the output of a one shot multivibrator 238, the purpose of which will be hereinafter explained, its reset input R is connected to the output of NAND gate 234, and it has an output connected to an input of NAND gate 232.

The interval pulses from the reading means 34 which are applied to input terminal 58' of translator 16, control the driving of the latch lines to zero to hold the latch output count, they set the flag buffer flip-flop 228 and flag flip-flop 236 to signal that the translator 16 is ready to read out data, and they reset the binary counters to zero after the latches are set. An interval signal, appearing at input terminal 58' is applied to a logic level shifter or converter 240 which has complementary outputs. The output having the positive going leading edge is applied to the input of the one shot multivibrator 238, and the inverting output of the one shot 238 is connected to the set input S of the flag buffer flip-flop 228. The one shot multivibrator 238 insures that the flag circuit gets only one signal per interval pulse.

The output of converter 240 having the negative going leading edge is connected to the set input S of a set-reset flip-flop 242, termed the latch flip-flop, which provides the function of driving the latch lines to logic zero, via a plurality of inverters 243, 244, 245, 246, 247, 248, 249, 250 and 251. For example, inverters 243, 244 and 245 have their inputs connected to the set output of latch flip-flop 242, and the inverter outputs are connected to the latch lines associated with terminals 136, 153 and 170, respectively. The reset input of latch flip-flop 242 is connected to the output of NAND gate 234.

The output of converter 240 having the negative going leading edge is also used to reset the binary counters, and is connected to the one shot reset multivibrator 212 via a one shot delay multivibrator 252. Delay multivibrator 252 delays the resetting of the binary counters for a time sufficient to insure that the latches are set by the latch flip-flop 242.

The translator 16 also includes input terminals ENF, IOI and SFS, which are also connected to the computer and receive signals therefrom referenced with the same letter notations. The ENF signal from the computer is a flag enable signal which is applied to the input of NAND gate 232. When flag buffer flip-flop 228 is set in response to an interval signal, and the flag enable signal ENF is received from the computer, NAND gate 232 changes its output from a one to a zero logic level, and the negative going leading edge of this change sets the flag flip-flop 226 and changes its set output from a zero to a one logic level.

Input terminal IOI receives signals IOI from the computer, which are in the form of timed or clocked pulses supplied by the computer when data is to be strobed from the driver gates. The IOI signals and the address line 224 provide the two inputs of an AND gate 254.

The output of AND gate 254 is connected to strobe line 208.

The computer provides the SFS signal when it is checking to see if the flag flip-flop 226 is set. Terminal SFS is connected to an input of NAND gate 230, which also has inputs connnected to the address line 224 and to the set output of the flag flip-flop 226. When an SFS signal is applied to NAND gate 230, the flag flip-flop 226 is set, and the address line 224 enabled, NAND gate 230 outputs a zero logic level which is inverted by inverter 256 and applied to one input of an AND gate 236. Another input of AND gate 236 is connected to a source of positive DC potential via terminal 258. When AND gate 236 outputs a logic one, terminal SKF, which is connected to the computer, signals that the flag flip-flop 226 is set and that the translator 16 is ready to read out its data.

Counting means 189, which sequentially enables the A, B and C channel read lines 184, 186 and 188, respectively, includes first and second J-K flip-flops 260 and 262, respectively, and first, second and third AND gates 264, 266 and 268, respectively. The reset inputs of flip-flops 260 and 262 are connected to the reset output of flag flip-flop 226, the set input of flip-flop 260 is connected to strobe line 208, the set output of flip-flop 260 is connected to the set input of flip-flop 262 and also to an input of AND gate 266, the reset output of flip-flop 260 is connected to inputs of AND gates 264 and 268, the set output of flip-flop 262 is connected to an input of AND gate 268, and the reset output of flip-flop 262 is connected to inputs of AND gate 264 and 266. The outputs of AND gates 264, 266 and 268 are connected to read lines 184, 186 and 188, respectively, which are associated with the A, B and C data channels, respectively. When the flag flip-flop 226 is reset, its reset output resets both of the flip-flops 260 and 262 of the counting means 189, providing two "high" inputs to AND gate 264, which enables read line 184. The trailing edge of the first strobe pulse which occurs subsequent to the resetting of flip-flops 260 and 262, which pulse is applied to the set input of flip-flop 260 from strobe line 208, triggers flip-flop 260, and the second AND gate 266 receives two high inputs and read line 186 is enabled to the exclusion of the other read lines. The trailing edge of the second strobe pulse triggers flip-flop 260, and the triggering of flip-flop 260 now triggers flip-flop 262, providing two high inputs to the third AND gate 268, enabling read line 188 to the exclusion of the other read lines. The counting means 189 is then reset by the resetting of the flag flip-flop 226, and the first AND gate 264 receives two high inputs, enabling read line 184 to the exclusion of the other read lines, and read line 184 awaits the next transfer of data from the translator 16 to the computer.

In the operation of translator 16 shown in FIG. 2, the magnetic tape to be translated is loaded into the tape reader, and the computer is given a start command which provides signals, from the computer, at input terminals LSCM, LSCL and IOG, to enable the address line 224. A signal from the computer is applied to input terminal CLF, which along with the signal from the address line 224, causes NAND gate 234 to output a signal with a negative going leading edge which resets flag flip-flop 226, flag buffer flip-flop 228, and the latch flip-flop 242, providing zero logic levels at their set outputs. After resetting these flip-flops, the signal at terminal CLF is terminated, which thus enables flip-flops 226, 228 and 242. The resetting of the flag flip-flop 226 provides a "one" logic level at its reset output, which resets the JK flip-flops 260 and 262 of counting means 189, enabling read line 184. Further, a signal from the computer is applied to input terminal CRS, which via the one shot multivibrator 212 and inverters 214, 216 and 218, resets the binary counters of the first, second and third groups 70, 72 and 74 of counters and latches to zero and, accordingly, the outputs of the associated latches.

The field magnetic tape 32 is then started in the reading means 34, and the pulses of the A, B and C data channels are applied to input terminals 60', 62' and 64', respectively, and the binary counters of groups 70, 72 and 74 count the pulses of each channel, and the latches associated with each binary counter follow so as to have the same binary count.

The first interval pulse occuring on the tape 32 is applied to input terminal 58' triggers the one shot 238, which in turn triggers the flag buffer flip-flop 228. The flag buffer flip-flop 228, along with an enable flag signal ENF from the computer causes NAND gate 232 to output a signal having a negative going leading edge which sets flag flip-flop 226, providing a logic one to the input of NAND gate 230, and enabling flip-flops 260 and 262 of the counting means 189. The first interval pulse also triggers latch flip-flop 242, driving the latch lines connected to the latches to logic zero, holding the counts in the latches as of the time of the leading edge of the interval pulse. Further, the interval pulse resets the binary counters to zero via the one shot delay 252, the one shot reset 212, and inverters 214, 216 and 218. The binary counters are now free to start counting data pulses which arrive between the first and second interval pulses.

The logic one output from the set output of flag flip-flop 226, the enabled address line 224, and an SFS signal from the computer, provide a signal through NAND gate 230, inverter 256, and AND gate 236 which appears at output terminal SKF, and which signals the computer to skip its next instruction, as the flag is now set, and it breaks the computer out of the loop it was in while it was checking for the setting of the flag flip-flop 226.

The computer is now instructed by the program to load data from the outputs of the latches associated with the A data channel, i.e., latch 82 and similar latches of groups 72 and 74, and accordingly provides clocked pulses at input terminal IOI. The first IOI pulse, plus the signal on address line 224, provide a pulse on the strobe line 208 which causes the 12 driver gates to read out the twelve bits of data from the A channel latches. The A read line 184 had been previously enabled, and the A channel latches, along with the A read lines, caused counter select gates 171, 173, 172 and 175 to provide signals at the inputs of driver gates 194, 195, 196 and 197. Similar A channel gates of counter select gates 190 and 192 are also providing inputs to driver gates 198, 199, 200, 201, 202, 203, 204 and 205. Thus, a pulse on strobe line 208 reads out the A channel count to the computer, and this count is stored in the register according to the store instruction of the computer program. The trailing edge of the first IOI pulse on the strobe line 208 advances counting means 189 one digit, enabling read line 186 and disabling the other two read lines.

The next IOI pulse applied to input terminal IOI loads the data from the latches associated with the outputs of the B data channel into an assigned location in a selected register of the computer, and the trailing edge or down clock of this pulse advances the counting means 189 another digit, to enable read line 188 and disable the other read lines. The third IOI pulse applied to input terminal IOI now strobes the C channel count from the driver gates, and loads this data into an assigned location of a selected register in the computer.

The next instruction of the computer program causes the computer to apply a signal to input terminal CLF, which along with the signal from the address line 224, resets the flag flip-flop 226, resets the flag buffer flip-flop 228, and resets the latch flip-flop 242. The resetting of the flag flip-flop 226 resets the counting means 189, enabling read line 184 and disabling the other read lines, and the resetting of the latch flip-flop 242 releases the outputs of the latches to follow the count of their associated binary counter inputs, which may already be counting pulses occurring between the interval pulse just received and the next interval pulse.

The driver routine has now been completed and the computer is free to return to its arithmetic and/or output routines. For example, if the stored data count was indicative of a measured electrical power usage in kilowatt hours, the count of the data computer may add the pulses representing a predetermined amount of kilowatts from each time intervals of a channel to totalize the pulses for determining a corresponding power demand on these data channels, it may check to see if the total count in each channel is larger than occurred in any other power demand interval for each channel, and if so, update the highest received demand figure, it may add the count of the last interval to the counts from the previous demand intervals, to keep a running total, and it may perform any other instructions which may have been given to it.

Stored data from the computer memory may be outputted via one of the registers of the arithmetic unit to an output peripheral, such as computer magnetic tape, or the data may be outputted directly to the output interface 18 via direct memory access 226, which steals cycles from the program in progress to load the data into the output peripheral without complete interruption of the program in progress.

The computer is also checking for the setting of the flag via SFS signals applied to the translator 16, and when the flag flip-flop is set, indicating the translator 16 is again ready to read out its data, IOI signals will be provided from the computer to load the count from the A, B and C latches into the computer register.

In summary, there has been disclosed new and improved methods and apparatus for translating recorded data into a form suitable for use with a large computer, by using a small general purpose digital computer. The translating apparatus includes a single set of binary counters for each channel of data, eliminating the dual sets commonly used by the prior art, which also eliminates the circuitry required for switching back and forth between the sets of counters, and it also eliminates a set of read lines. Latches are used to provide binary outputs which follow the output of binary counters, and they hold the count provided by their associated counters at each interval signal while the counters are being reset to start counting during the next timing interval. After the information in the latches is read out, the latches are reset or released to pick up the count of their associated binary counter. The counters are reset to zero, thus eliminating the necessity of subtracting readings to obtain the count for each timing interval.

While the invention has been described using 12 binary counters, it is to be understood that the number of bits in the counters, and thus the number of bits transferred to the computer as each channel of information is read, may be changed as required. For example, increasing the time interval may require more bits than twelve in the counters, and the associated circuitry would be expanded as required to increase the number of bits transferred to the computer as each channel is read.

I claim as my invention:

1. Translating apparatus for transferring data from an input device to a computer, comprising:

means providing at least one channel of input data pulses each responsive to a predetermined amount of a measured quantity, means providing another channel of spaced input interval pulses occurring at time intervals corresponding to the intervals said data pulses are initiated in response to said measured quantity, means converting the input data and interval pulses of said channels into data and interval binary pulse signals, input binary counter means connected to said one and said another channels so as to be responsive to the data and interval binary pulse signals for counting in a binary count the data pulses occurring between consecutive interval pulses, latch means connected to be normally in an enabled reset condition so as to have the same binary count as said input counter means and further to be operative between said reset condition and a set condition whereupon the latch means holds the binary count occurring therein, means setting said latch means to said set condition in response to an interval binary pulse signal to hold the binary count occurring in the latch means at the time it is set, a computer, means responsive to the interval binary pulse signal providing a signal to said computer for signaling that said latch means has been set, means responsive to a signal occurring subsequent to the signal to the computer and initiated from said computer for reading out the binary count being held in said latch means to said computer, and means resetting said latch means after the held binary count has been transferred to said computer so as to return to the binary count of said input counter means established by a subsequent interval of data pulses.

2. The translating apparatus of claim 1 including delay means, and reset means, said reset means resetting the input counter means in response to an interval binary pulse, signal with the delay means being connected between the means providing the interval binary pulse and said reset means to delay the application of the interval binary pulse signal to said reset means and insure that the latch means has been set to hold the count of the input counter means by the interval binary pulse.

3. The translating apparatus of claim 1 including anticoincident means connected between the means providing the input data pulse and spaced interval binary pulses, and the input counter means, said anticoincident means preventing a data binary pulse from coinciding with an interval binary pulse.

4. The translating apparatus of claim 1 wherein the input data means provides additional channels of input data binary pulses, and including separate input counter means and separate latch means for each additional channel of input data binary pulses.

5. The translating apparatus of claim 4 wherein the means which reads out the binary counts on said latch means includes means for sequentially transferring the held counts associated with the different data channels.

6. The translating apparatus of claim 5 wherein the means for sequentially transferring the binary count held by the latch means includes a read line for each channel of input data, means for sequentially enabling said read lines, and selector gates connected to predetermined read lines and predetermined latch means, said selector gates reading out the held counts when their associated read lines are enabled.

7. The translating apparatus of claim 6 wherein the means for reading out the count on said latch means includes a strobe line responsive to clock signals from the computer, and driver gates, said driver gates each having an input connected to the strobe line, an input connected to a predetermined output of a selector gate, and an output connected to the computer.

8. The translating apparatus of claim 1 wherein the input data pulse means and input interval pulse means include a magnetic tape which provides magnetically recorded data and interval pulses which are converted to electrical binary pulses by the converting means.

9. The translating apparatus of claim 8 wherein said magnetically recorded data pulses represent a function of measured electrical power usage in kilowatt hour units.

* * * * *